United States Patent
Stephenson et al.

(10) Patent No.: US 12,454,469 B2
(45) Date of Patent: Oct. 28, 2025

(54) CURRENT BASED WATER TREATMENT PROCESS AND SYSTEM

(71) Applicant: Muddy River Technologies Inc., Delta (CA)

(72) Inventors: Robert John Stephenson, Vancouver (CA); Travis David Wayne Reid, Vancouver (CA); Michael Stephen Gardner, Delta (CA)

(73) Assignee: Muddy River Technologies Inc.

( * ) Notice: Subject to any disclaimer, the term of this patent is extended or adjusted under 35 U.S.C. 154(b) by 864 days.

(21) Appl. No.: 17/278,609

(22) PCT Filed: Sep. 23, 2019

(86) PCT No.: PCT/CA2019/051355
§ 371 (c)(1),
(2) Date: Mar. 22, 2021

(87) PCT Pub. No.: WO2020/061686
PCT Pub. Date: Apr. 2, 2020

(65) Prior Publication Data
US 2022/0033284 A1 Feb. 3, 2022

Related U.S. Application Data

(60) Provisional application No. 62/737,283, filed on Sep. 27, 2018.

(30) Foreign Application Priority Data

Sep. 27, 2018 (CA) ........................ 3018901

(51) Int. Cl.
C02F 1/463 (2023.01)
C02F 1/00 (2023.01)
(Continued)

(52) U.S. Cl.
CPC .............. *C02F 1/463* (2013.01); *C02F 1/004* (2013.01); *C02F 1/20* (2013.01); *C02F 1/46114* (2013.01);
(Continued)

(58) Field of Classification Search
CPC .. C02F 1/463; C02F 1/004; C02F 1/20; C02F 1/46114; C02F 1/66; C02F 2001/46133;
(Continued)

(56) References Cited

U.S. PATENT DOCUMENTS 4,053,378 A 10/1977 Moeglich et al.
4,094,755 A 6/1978 Moeglich
(Continued)

FOREIGN PATENT DOCUMENTS

CA 2348173 A1 11/2001
EP 2035335 B1 3/2009
(Continued)

OTHER PUBLICATIONS

Translation of Yamamoto (Year: 1995).*
(Continued)

*Primary Examiner* — Ekandra S. Miller-Cruz
(74) *Attorney, Agent, or Firm* — Wells St. John P.S.

(57) ABSTRACT

Process for treatment of wastewater is provided. The wastewater includes suspended or dissolved wastewater components and an aqueous component. During the treatment process, at least a portion of a solids bed through which the wastewater is passed is dissolved using an electric current. Dissolution of the solids bed produces constituents which react with the wastewater and enable separation of the suspended or dissolved wastewater components from the aqueous component. Also provided is a system for carrying out the process.

22 Claims, 5 Drawing Sheets

(51) Int. Cl.
  *C02F 1/20* (2023.01)
  *C02F 1/461* (2023.01)
  *C02F 1/66* (2023.01)
  *C02F 101/16* (2006.01)
  *C02F 101/20* (2006.01)

(52) U.S. Cl.
  CPC ...... *C02F 1/66* (2013.01); *C02F 2001/46133* (2013.01); *C02F 2101/16* (2013.01); *C02F 2101/203* (2013.01)

(58) Field of Classification Search
  CPC ...................... C02F 2101/16; C02F 2101/203; B01F 21/30; B01F 33/051
  USPC ......................................................... 210/717
  See application file for complete search history.

(56) References Cited

U.S. PATENT DOCUMENTS

| | | | |
|---|---|---|---|
| 4,176,038 A | 11/1979 | Moeglich | |
| 6,391,186 B1* | 5/2002 | Stauffer | C02F 1/46114 205/702 |
| 6,428,697 B1* | 8/2002 | Edgar | C02F 9/00 210/197 |
| 2013/0001099 A1* | 1/2013 | Pulliainen | C02F 1/463 204/228.1 |
| 2017/0165680 A1* | 6/2017 | Johnson | C02F 1/001 |

FOREIGN PATENT DOCUMENTS

| | | | | |
|---|---|---|---|---|
| EP | 2985264 A1 * | 2/2016 | ............ | C02F 1/4602 |
| FR | 2342794 | 9/1977 | | |
| JP | H07100466 A1 * | 4/1995 | ................ | C02F 1/46 |

OTHER PUBLICATIONS

Canadian Intellectual Property Office, the International Search Report and the Written Opinion of the International Searching Authority, mailed on Dec. 12, 2019 for PCT/CA2019/051355 filed on Sep. 23, 2019.

\* cited by examiner

CURRENT BASED WATER TREATMENT PROCESS AND SYSTEM

CROSS REFERENCE TO RELATED APPLICATIONS

This application claims priority from U.S. Provisional Patent Application No. 62/737,283, filed on Sep. 27, 2018, entitled "Process to Accelerate Dissolution of Solids into Water", and Canadian Patent Application No. 3,018,901, filed on Sep. 27, 2018, entitled "A Process to Accelerate Dissolution of Solids into Water", entireties of which are incorporated herein by reference.

FIELD

Embodiments described herein relate to a process for treatment of wastewater and the like for reuse of the water or for discharge of treated water to the environment or for the recovery of certain materials from the water. Embodiments described herein also relate to a system for carrying out the process.

BACKGROUND

Treatment of wastewater is desirable either to conserve fresh water or to protect the environment from pollution or to minimize the waste of material by recovering and reusing certain materials such as metals from the wastewater.

Wastewater typically has pollutants or contaminants, in suspended or dissolved form, that are distributed in an aqueous medium. Wastewater may include but is not limited to wastewater from hydraulic fracturing, oily water, mining water, brine, industrial wastewater, municipal wastewater, anaerobic digester effluent, liquid agricultural waste, landfill leachate, storm water or groundwater. Various processes for treatment of wastewater are known. The following paragraphs discuss some of the treatment processes known to the Applicant.

Filtration processes, including filter media such as membranes, screens or meshes, are known to separate suspended contaminants but not dissolved contaminants from the aqueous medium. However, fouling of the filter media by the suspended contaminants is a common occurrence. This reduces throughput, and necessitates frequent servicing and/or replacement of the filter media.

Electrocoagulation is another process known for treatment of wastewater. In this process, one or more electrodes are dissolved by application of electricity to add coagulating or flocculating ions to the wastewater. These ions destabilize contaminants in the wastewater, allowing them to coagulate and increase in size thereby allowing their removal from the aqueous medium through flotation, sedimentation or filtration. The electrodes are prone to fouling and clogging, long before the electrodes are fully consumed. This necessitates periodic cleaning or replacement of the electrodes, thereby limiting the usefulness of the process. Further, electrocoagulation requires significant electrical conductivity of wastewater, either limiting the types of wastewaters that can be treated or requiring addition of a conductive additive such as salt or application of elevated voltages in order to provide the required current to provide treatment. Dosing with a conductive additive increases costs and limits options for treated wastewater reuse or disposal due to increased levels of elements such as chloride, sulphate, sodium or calcium in the treated wastewater.

Treatment processes involving addition of chemical additives, such as inorganic or organic coagulants, polymeric or organic or inorganic flocculation agents, to the wastewater are also known. However, these chemical additives can cause corrosion and fouling of system components. Further, constituents such as chloride, sulphate, calcium, or sodium, which may have undesirable impacts on the water chemistry, are inherently introduced into the water during this process. This limits the ability to reuse or discharge the treated water to the environment. In addition, cost of the chemical delivery systems, the chemical additives themselves, and management of waste produced during the process limits adoption of these processes.

Another treatment process involves use of sorptive materials such as resins, iron particles, activated carbon, biochar or other adsorbents for removal of dissolved contaminants from wastewater. In this process, solid particles are positioned in beds located in containers. As the wastewater passes through these adsorptive beds, molecules of certain types of contaminants in the wastewater are attached physically or chemically to the surface of the solid particles thereby separating them from the aqueous medium of the wastewater. In a periodic regeneration process, the attached molecules are removed, for example, by thermal regeneration or chemical conditioning of the adsorptive beds. However, the number of adsorption sites available on the surface of the solid particles in the beds is finite, limiting the capacity of the beds to remove contaminants. Even with attempted regeneration of the adsorptive beds, their capacity to remove contaminants diminishes over extended use. This results in the beds ultimately requiring replacement to meet treatment requirements. Replacement of the beds results in interruption of the treatment process, and adds to waste generation and costs.

Therefore, it would be beneficial in terms of cost and efficiency if a process and system for treating wastewater was available which was simple, did not clog or foul the system components or negatively impact the water chemistry and which could be carried out substantially uninterrupted with minimal downtime without resulting in waste generation.

SUMMARY

Embodiments described herein relate to a process and system for treatment of wastewater and the like.

Accordingly, in one embodiment a process for treatment of a wastewater stream is provided. The wastewater stream includes suspended or dissolved wastewater components and an aqueous component. The method comprises providing a solids bed and locating at least one pair of spaced electrodes within the bed. The solids bed includes at least partially electrically conductive particles. A wastewater stream is flowed through the solids bed. Further, an electric current is passed through at least the at least one pair of spaced electrodes to thereby dissolve at least a portion of the solids bed to produce dissolved constituents. The dissolved constituents react with the wastewater stream to enable separation of the wastewater components from the aqueous components. The separated wastewater components are then removed from the aqueous component.

Accordingly, in another embodiment a system for treatment of a wastewater stream is provided. The wastewater stream includes suspended or dissolved wastewater components and an aqueous component. The system comprises a reactor having an inlet and an outlet. The reactor is adapted to receive the wastewater stream. The system further comprises a solids bed which is located within the reactor and at least one pair of electrodes located within the solids bed in a spaced apart relationship. The solids bed includes at least partially electrically conductive particles. An electric current source is operatively coupled to the reactor. During operation, an electric current generated by the electric current source dissolves at least a portion of the solids bed to produce dissolved constituents. The dissolved constituents react with the wastewater stream to enable separation of the suspended or dissolved wastewater components from the aqueous component.

DETAILED DESCRIPTION

Embodiments described herein relate to a process and system for treatment of wastewater and the like.

As used herein, "wastewater" or a "a wastewater stream" includes wastewater components and an aqueous component such as water. The wastewater components may be pollutants or contaminants. The wastewater components may be suspended or dissolved in the aqueous component. The wastewater components may include but are not limited to dissolved ammonium ions, or dissolved metals such as copper, iron, nickel, or zinc, or non-dissolved metals or suspended solids such as silt, clay, phosphorus, arsenic, or other organic or inorganic components.

Figure 1:
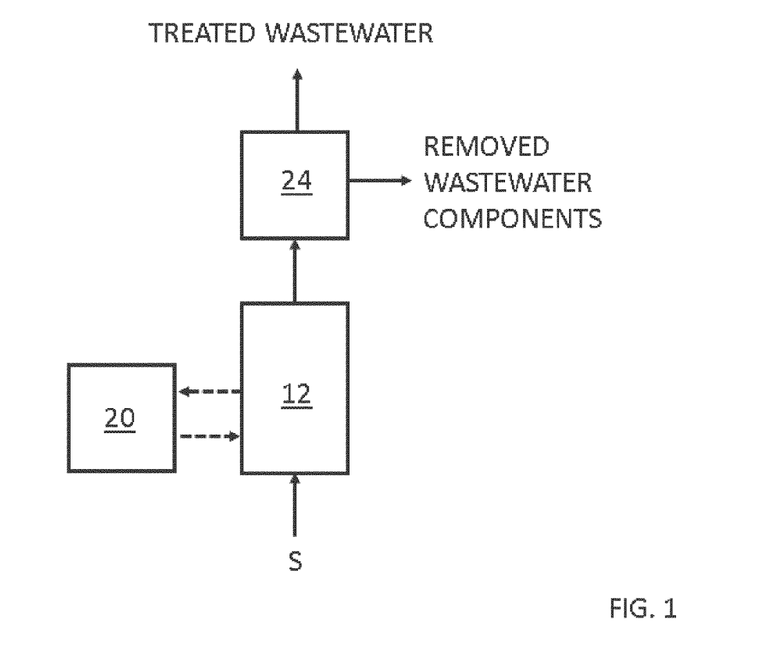
FIG. 1 is a process flow chart describing one embodiment of a wastewater treatment process.

FIG. 1 provides an overview of the treatment process described herein. In general, the process includes providing a solids bed 10 in a reactor 12 with one or more pairs of spaced electrodes located within the solids bed as better seen in FIGS. 3 to 5. During operation, a wastewater stream S is introduced into the reactor 12 and a portion of the solids bed is dissolved by an electric current generated in the reactor 12 to produce constituents. The electric current is generated by an electric current source 20. These constituents react with the wastewater stream and enable separation of the suspended or dissolved wastewater components from the aqueous component of the wastewater stream. The separated wastewater components are then removed from the aqueous component in one or more downstream units 24 cooperating with the reactor 12.

Figure 3:
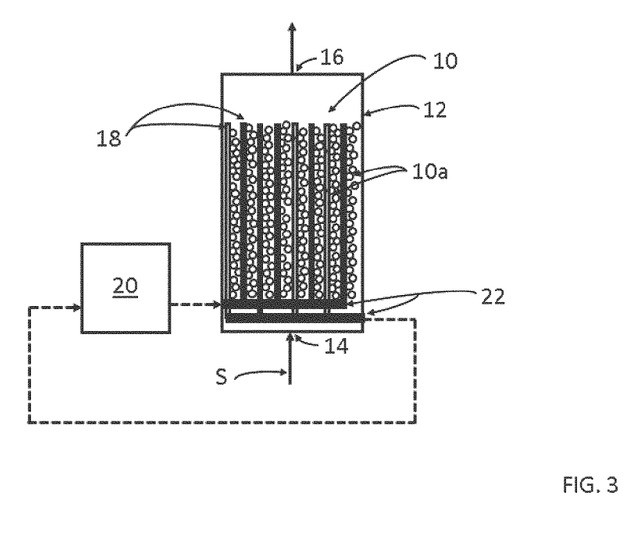
FIG. 3 is a schematic representation illustrating primary features of the system of FIG. 2 including a reactor.
Figure 4:
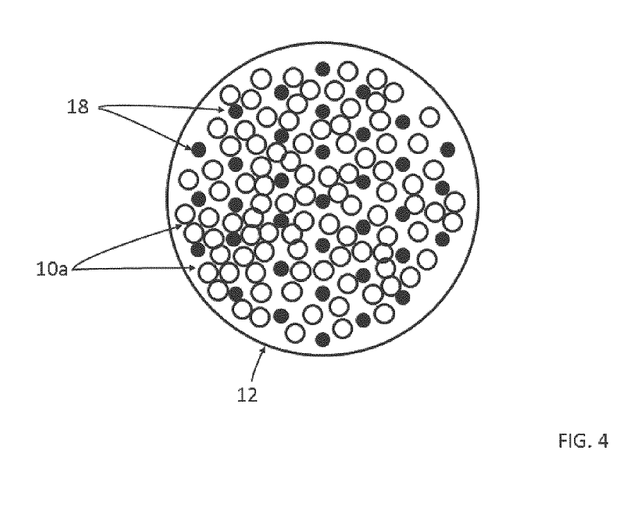
FIG. 4 is a top view of the reactor of FIG. 3.
Figure 5:
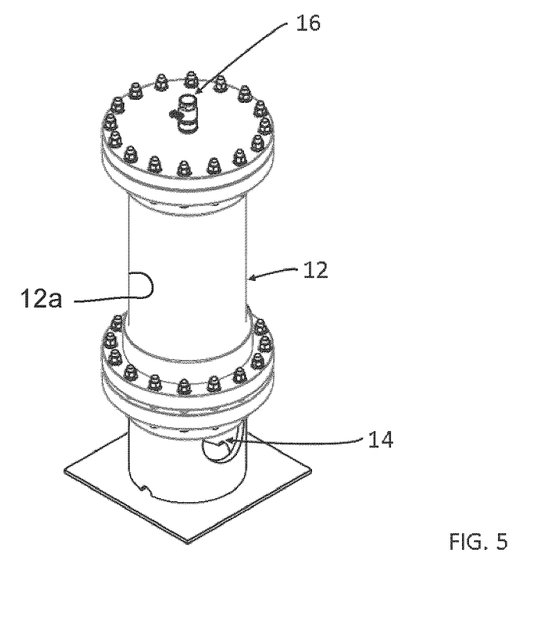
FIG. 5 is a perspective view of the reactor of FIG. 3.

In detail and with reference to FIGS. 3 to 5, a solids bed 10 is located within a reactor 12. The solids bed 10 is formed of partially electrically conductive particles 10a such as lava rock particles, magnesium particles, steel particles, iron particles or aluminum particles. In one embodiment, a size of the particles of the solids bed 10 is in a size range of 0.1 mm to 10 cm.

The reactor 12 has an inlet 14 and an outlet 16. In one embodiment, an internal surface 12a of the reactor 12 is made of a non-reactive material such as plastic, glass, fibreglass, concrete, clay or a coated metal.

One or more pairs of spaced electrodes 18, all of which may for example be substantially evenly spaced apart, are located within the solids bed 10. The electrodes 18 may be made of a non-consumptive material or a consumptive material. In one embodiment, the electrodes 18 are made of titanium, graphite, stainless steel, carbon steel or aluminum and a spacing between the electrodes in each pair is in a range of 1 mm to 1 m. In the embodiment illustrated in FIG. 3, not intended to be limiting, the electrode pairs are rods extending from the inlet 14 of the reactor 12 to the outlet 16 of the reactor 12.

An electric current source 20 is operatively coupled to the one or more pairs of electrodes 18 and the solids bed 10 through electrical headers 22. The electric current source 20 generates an electric current which may be a direct current (DC) or a rectified alternating current or an alternating current (AC). In one embodiment, the electric current generated by the electric current source 20 is in a range of one ampere to 1,000 amperes or greater.

A wastewater stream S containing suspended or dissolved wastewater components and an aqueous component is introduced into the reactor 12 through the inlet 14. In one embodiment, not intended to be limiting, the wastewater stream S flows in an upward direction within the reactor, past the spaced pairs of electrodes, and through the solids bed 10. Flow in the upward direction prevents compacting of the particles 10a in the solids bed 10.

As described before, the electric current generated by the electric current source 20 dissolves a portion of the particles 10a in the solids bed 10 to produce dissolved constituents. Since the particles 10a of the solids bed 10 are partially electrically conductive, an electric circuit is completed between the pairs of electrodes without resulting in an electrical short circuit enabling dissolution of the particles 10a and production of the dissolved constituents.

These dissolved constituents react with the wastewater stream S introduced into the reactor 12 and enable separation of the wastewater components of the wastewater stream S from the aqueous component of the wastewater stream S. Applicant has found that a low to moderate level of electrical conductivity of the particles 10a enables the electric circuit to be completed thereby enabling the process described herein to treat wastewater of even low conductivity.

Separation of the wastewater components from the aqueous component can be effected in various ways.

In one embodiment, the constituents produced by dissolution of the particles 10a in the solids bed 10 serve as coagulants which allow agglomeration of the wastewater components to form insoluble aggregates thereby enabling separation of the wastewater components from the aqueous component.

In one embodiment, the suspended or dissolved wastewater components in the wastewater stream include phosphorus, arsenic, silt, clay, and emulsified petroleum hydrocarbons and the solids bed 10 includes lava rock particles. Lava rock typically contains iron, aluminum, magnesium and calcium. Dissolution of the lava rock introduces cations of iron, aluminum, magnesium and calcium into the wastewater stream S. These cations allow agglomeration of the wastewater components, namely phosphorus, arsenic, silt, clay, and emulsified petroleum hydrocarbons to form insoluble aggregates. The size of the insoluble aggregates or the difference in specific gravity between the water and the aggregates enables separation of the aggregates from the aqueous component.

In another embodiment, separation of the wastewater components may be effected by changing a pH level of the wastewater stream. This is typically employed when the wastewater stream S contains dissolved metals. In this embodiment, the constituents produced by dissolution of the particles 10a in the solids bed 10 increase a pH level of the wastewater stream to a range of approximately 8.0-12.0 enabling formation of insoluble metal hydroxide compounds which can be easily removed from the aqueous component as would be known to one skilled in the art.

In another embodiment, when the wastewater stream S contains dissolved ammonium ions (wastewater components), separation of the dissolved ammonium ions is effected by changing the ionic nature of the dissolved ammonium ions by the constituents. In this embodiment, the constituents increase a pH level of the wastewater stream S to a range of approximately 8.0-12.0 to convert the dissolved ammonium ions to free ammonia which has equilibrium between aqueous and gaseous forms, thereby enabling separation of the wastewater components from the aqueous component. Removal of the separated wastewater components typically occurs in one or more downstream steps such as sedimentation, filtration, flotation or stripping in one or more corresponding downstream cooperating units 24 such as a filtration tank or a stripping tower or spray systems.

The process described herein adds constituents to the wastewater stream S as a result of applying electricity to the solids bed 10 which constituents react with the wastewater stream S or the wastewater components to enable separation of the wastewater components from the aqueous component of the wastewater stream S.

Figure 2:
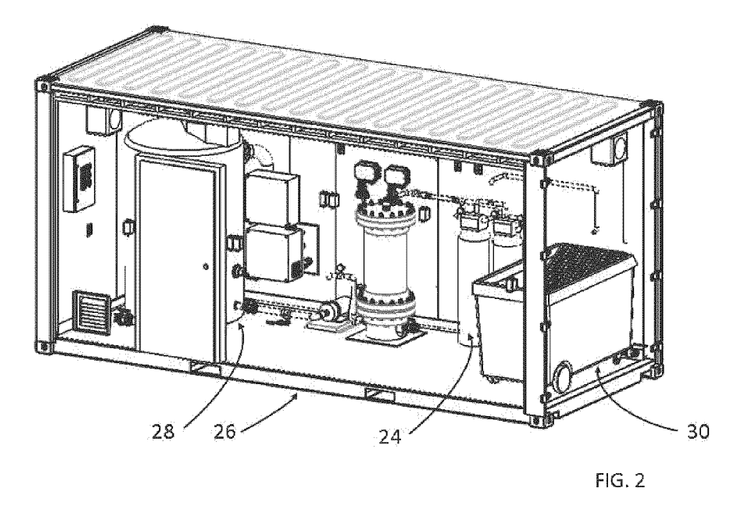
FIG. 2 is a schematic representation of a wastewater treatment system constructed to carry out the process of FIG. 1, the system being located in conjunction with other cooperating units.

FIG. 2 illustrates an embodiment wherein the reactor 12 and other cooperating components are installed and operated in a shipping container 26. As seen in FIG. 2, the wastewater stream S is pumped from a storage tank 28 into the reactor 12 using one or more pumps and associated piping. After processing in the reactor including separation of the wastewater components from the aqueous component, the separated wastewater components are removed from the aqueous components in one or more downstream cooperating units 24 which are operatively coupled to the reactor 12. The removed wastewater components (depending on their nature) may be collected for disposal/reuse in or more bins 30 located near units 24.

As described before, the process may dissolve the particulates 10a in the solids bed 10 to introduce constituents into the wastewater stream S that allow coagulation of the wastewater components or change a pH of the wastewater stream to enable formation of insoluble compounds or change an ionic nature of the wastewater components to enable separation of the wastewater components from the aqueous component of the wastewater stream S.

Process parameters such as reactor size and hydraulic residence time within the reactor; nature of the solids bed including selection of the material of the solids bed and particle size; nature of the electric current source and its rating; electrode specifics including number of pairs of electrodes, material of the electrodes and spacing between the electrodes so as to provide even distribution of the electric current depends on at least the nature of the wastewater components of the wastewater stream S.

For example, the size of the reactor 12 may range from less than 1 litre to several hundred cubic meters or greater. The hydraulic residence time in the reactor 12 may be 10 seconds or less to several hours or several days. The voltage to provide the required electric current may be less than 10 volts to 110 volts, 208 volts, 220 volts, 370 volts, 480 volts, 540 volts, 575 volts, 600 volts or greater. In addition to other parameters, the voltage to provide the required electric current depends on the electrical conductivity of the solids bed particles 10a and the electrical conductivity of the wastewater which may range from 100 μS/cm or less to 10,000 mS/cm or greater.

Dissolution of the particles 10a in the solids bed 10 and separation of the wastewater components of the wastewater stream S from its aqueous component depends on at least the combined effect of the strength of the electric current, hydraulic residence within the reactor and nature of the solids bed. For example, similar performance may result from a low electric current and a long hydraulic residence time or a high electric current and a short hydraulic residence time.

Since the particles 10a of the solids bed 10 are dissolved by the process, entire particles in the solids bed are being utilized, unlike conventional adsorption processes wherein only the surface area of each particle is being utilized. Therefore, only an infrequent supplementation of the solids bed is required as opposed to frequent supplementation of the solids bed in conventional adsorption processes.

In conventional adsorption processes, only the surface area of the particles in the adsorption beds is utilized to remove wastewater components. Therefore, the capacity of the adsorbent beds to remove wastewater components is limited by the finite number of adsorption sites on the surface of the adsorbent particles.

In the process described herein, applying an electric current to an adsorbent bed such as the solids bed 10 activates the surface and dissolves the adsorbent particles in the solids bed so the reaction is a fast liquid: liquid reaction compared to slower solids: liquid reactions of conventional adsorbent processes. The wastewater components are not accumulated on the surface of the particles in the solids bed as in conventional adsorption processes thereby eliminating the regeneration step required in conventional adsorption processes which interrupts system performance, results in waste and adds to costs.

Example

Thirty pairs of electrodes formed from titanium are inserted into a solids bed containing lava rock particles. Each electrode is 1 m long and has a diameter of 0.5 cm. The lava rock particles contain aluminum, iron, magnesium, and calcium. The size of the lava rock particles range between 0.5 mm to 3 cm.

The electrodes and the solids bed are located in a reactor. The size of the reactor is 100 litres.

A wastewater stream S to be treated is allowed to flow through the lava rock bed, in a bottom to top configuration. The flow rate of the wastewater stream S within the reactor is 60 litres/min. Dwell time of the wastewater stream within the reactor 12 is approximately 20 seconds. The wastewater stream S contains the following wastewater components: dissolved metal ions of copper, iron, nickel and zinc; phosphorus; and arsenic. The aqueous component of the wastewater stream is water.

A voltage is applied to the electrode pairs so as to dissolve particles of the lava rock bed into the wastewater stream S by an electric current flowing through the electrode pairs and the lava rock bed. The electric current is in a range of 10 to 50 amps and the voltage required to generate the electric current is approximately 20 volts. Dissolution of the lava rock particles produces at least the following constituents: cations of aluminum, iron, magnesium, and calcium; oxygen gas, hydroxide ($OH^-$) and hydrogen gas ($H_2$).

Electrical conductivity of the wastewater stream is approximately 500 μS/cm.

Reactions in the solids bed that dissolve the lava rock particles are as follows:

$$Al \Rightarrow Al^{3+}_{(aq)} + 3e^-$$

$$Fe \Rightarrow Fe^{3+}_{(aq)} + 3e^-$$

$$Mg \Rightarrow Mg^{2+}_{(aq)} + 2e^-$$

$$Ca \Rightarrow Ca^{2+}_{(aq)} + 2e^-$$

Cations of aluminum, iron, magnesium and calcium serve as coagulants that allow the phosphorus and arsenic to form aggregates that can be removed from the aqueous component of the wastewater stream S in one or more filtration tanks.

Reaction in the solids bed that hydrolyses water and produces oxygen gas ($O_2$) is as follows:

$$2H_2O \Rightarrow O_{2(g)} + 4H^+ + 4e^-$$

Production of the oxygen gas increases the oxidation reduction potential of the water and enables the dissolved metals to form insoluble metal hydroxides that can be removed from the aqueous component of the wastewater stream S.

Reaction in the solids bed to hydrolyse water and produce hydroxide (OFF) and hydrogen gas ($H_2$):

$$2H_2O + 2e^- \Rightarrow 2OH^- + H_{2(g)}$$

The reaction produces hydroxide ($OH^-$) which increases the pH conditions and enables the dissolved metals to form insoluble metal hydroxides such as iron hydroxide, copper hydroxide and zinc hydroxide.

What is claimed is:

1. A method for treating a wastewater stream, the wastewater stream including suspended or dissolved wastewater components and an aqueous component, the method comprising:
    providing a solids bed consisting entirely of electrically conductive particles made of metal;
    locating at least one pair of spaced electrodes within the solids bed;
    flowing the wastewater stream upwardly through the solids bed;
    passing an electric current through the at least one pair of spaced electrodes to induce an electrolysis reaction that thereby dissolves the electrically conductive particles to produce metal cations which react with the wastewater stream to enable separation of the wastewater components from the aqueous component, wherein only products of the electrolysis reaction including constituents from dissolving the electrically conductive particles are introduced to the wastewater stream and wherein the electric current is an alternating current (AC); and
    removing the separated wastewater components from the aqueous component downstream of the solids bed.

2. The method of claim 1, wherein the metal cations cause agglomeration of the wastewater components to form insoluble aggregates thereby enabling separation of the wastewater components from the aqueous component.

3. The method of claim 1, wherein the products of the electrolysis reaction include hydroxide to increase a pH level of the wastewater stream and enable formation of insoluble compounds of the wastewater components thereby enabling separation of the wastewater components from the aqueous component.

4. The method of claim 3, wherein the wastewater stream is acidic and the wastewater components include metal cations, and wherein the products of the electrolysis reaction increase the pH level of the wastewater stream up to a pH of 12.0 so as to form insoluble metal hydroxide compounds and insoluble aggregates to thereby facilitate removal of the insoluble metal hydroxide compounds and insoluble aggregates from the wastewater stream.

5. The method of claim 1, wherein the wastewater components include dissolved ammonium ions, and wherein the products of the electrolysis reaction include hydroxide to increase a pH level of the wastewater stream to a range of approximately 9.0-12.0 to convert the dissolved ammonium ions to free ammonia which has an equilibrium between aqueous and gaseous forms.

6. The method of claim 1 wherein the at least one pair of spaced electrodes are manufactured of a non-consumptive material.

7. The method of claim 1 further comprising locating the solids bed and the at least one pair of spaced electrodes within a reactor, and wherein the at least one pair of spaced electrodes comprises a plurality of rods that are spaced apart and evenly distributed throughout the reactor.

8. The method of claim 2 further comprising carrying out the step of removal in a filtration tank operatively coupled to and downstream of the solids bed.

9. The method of claim 5 further comprising carrying out the step of removal in a stripping device operatively coupled to and downstream of the solids bed.

10. A system for treating a wastewater stream, the wastewater stream including suspended or dissolved wastewater components and an aqueous component, the system comprising:
    a reactor having an inlet and an outlet and adapted to receive the wastewater stream, wherein the inlet and the outlet of the reactor are positioned to generate an upward flow of the wastewater stream through the solids bed;
    a solids bed located within the reactor, the solids bed consisting entirely of electrically conductive particles made of metal;
    at least one pair of electrodes located within the solids bed in a spaced apart relationship;
    an electric current source operatively coupled to the at least one pair of electrodes to supply an electric current, wherein the electric current is an alternating current (AC),
    and wherein during operation, the electric current generated by the electric current source is passed through the at least one pair of spaced electrodes to induce an electrolysis reaction that dissolves the electrically conductive particles to produce metal cations which react with the wastewater stream to enable separation of the wastewater components from the aqueous component, wherein only products of the electrolysis reaction including constituents from dissolving the electrically conductive particles are introduced to the wastewater stream; and
    a downstream unit configured to remove the separated wastewater components from the aqueous component downstream of the solids bed.

11. The method of claim 1, wherein the electric current is in a range of one ampere to 1,000 amperes.

12. The method of claim 1, wherein a spacing between the at least one pair of electrodes is in a range of 1 mm to 1 m.

13. The method of claim 1, wherein the electrically conductive particles are magnesium or steel or iron or aluminum.

14. The system of claim 10, wherein an internal surface of the reactor is made of a non-reactive material.

15. The method of claim 1, wherein the at least one pair of electrodes is made of titanium or graphite or stainless steel or carbon steel or aluminum.

16. The method of claim 7 wherein an internal surface of the reactor is made of a non-reactive material.

17. The method of claim 16, wherein the non-reactive material is plastic or glass or fibreglass or concrete or clay or a coated metal.

18. The method of claim 3 further comprising carrying out the step of removal in a sedimentation tank operatively coupled to and downstream of the solids bed.

19. The method of claim 2 further comprising carrying out the step of removal in a flotation tank operatively coupled to and downstream of the solids bed.

20. The method of claim 1 wherein the step of passing an electric current through the at least one pair of spaced electrodes includes monitoring a flow rate of the wastewater stream entering the solids bed and controlling an amount of electric current passed through the at least one pair of spaced electrodes by increasing the electric current in response to a detected increased flow rate and decreasing the electric current in response to a detected decreased flow rate.

21. The method of claim 1 wherein the step of flowing the wastewater stream upwardly through the solids bed comprises preventing compacting of the electrically conductive particles in the solids bed and thereby preventing electrical short circuiting.

22. The system of claim 10 wherein the inlet and the outlet of the reactor are positioned to generate the upward flow of the wastewater stream through the solids bed during operation to prevent compacting of the electrically conductive particles in the solids bed and thereby prevent electrical short circuiting.

* * * * *